(12) United States Patent
Wang et al.

(10) Patent No.: US 12,092,470 B2
(45) Date of Patent: Sep. 17, 2024

(54) VEHICLE LOCALIZATION METHOD AND DEVICE, ELECTRONIC DEVICE AND STORAGE MEDIUM

(71) Applicant: BEIJING XIAOMI MOBILE SOFTWARE CO., LTD., Beijing (CN)

(72) Inventors: Chao Wang, Beijing (CN); Chi Zhang, Beijing (CN); Hao Liu, Beijing (CN); Zhijun Xie, Beijing (CN); Kuiyuan Yang, Beijing (CN); Kun Guo, Beijing (CN); Rui Cai, Beijing (CN); Zhiwei Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 323 days.

(21) Appl. No.: 17/588,076

(22) Filed: Jan. 28, 2022

(65) Prior Publication Data

US 2023/0078721 A1 Mar. 16, 2023

(30) Foreign Application Priority Data

Sep. 16, 2021 (CN) .......................... 202111089405.3

(51) Int. Cl.
*G01C 21/34* (2006.01)
*G06V 20/56* (2022.01)
*G06V 20/58* (2022.01)

(52) U.S. Cl.
CPC ..... *G01C 21/3476* (2013.01); *G01C 21/3461* (2013.01); *G06V 20/58* (2022.01); *G06V 20/588* (2022.01)

(58) Field of Classification Search
CPC ........... G01C 21/3476; G01C 21/3461; G01C 21/30; G01S 5/16; G06V 10/44; G06V 20/58; G06V 20/586; G06V 20/588
(Continued)

(56) References Cited

U.S. PATENT DOCUMENTS

2009/0228204 A1* 9/2009 Zavoli .................... G01C 21/30
701/532
2019/0035101 A1* 1/2019 Kwant ...................... G06T 7/12
(Continued)

FOREIGN PATENT DOCUMENTS

CN 111427373 A 7/2020
CN 111780771 A 10/2020
DE 102012013492 A1 * 1/2013 ......... G06K 9/00798

OTHER PUBLICATIONS

Hee Chang Moon, Kyoung Moo Min and Jung Ha Kim, "Vision system of Unmanned Ground Vehicle," 2008 International Conference on Control, Automation and Systems, Seoul, Korea (South), 2008, pp. 599-603 (Year: 2008).*

(Continued)

*Primary Examiner* — Jonathan L Sample
*Assistant Examiner* — James Miller Watts, III
(74) *Attorney, Agent, or Firm* — Cozen O'Connor

(57) ABSTRACT

A vehicle localization method and device, an electronic device and a storage medium. The vehicle localization method includes: acquiring an image of a scene where a vehicle is located, the image comprising a semantic element; determining an element category corresponding to the semantic element; matching the semantic element with a map element to acquire a matching result by a matching method corresponding to the element category; and determining localization information of the vehicle according to the matching result.

20 Claims, 9 Drawing Sheets

(58) Field of Classification Search
USPC .......................................................... 701/533
See application file for complete search history.

(56) References Cited

U.S. PATENT DOCUMENTS

| | | | |
|---|---|---|---|
| 2019/0266418 A1* | 8/2019 | Xu ........................ | G06V 10/764 |
| 2021/0191397 A1 | 6/2021 | Lin et al. | |
| 2021/0240195 A1* | 8/2021 | Atherton .............. | G05D 1/0038 |
| 2021/0295061 A1* | 9/2021 | Yang ..................... | B60W 30/12 |
| 2022/0326023 A1* | 10/2022 | Xu ..................... | B60W 60/0025 |
| 2023/0129620 A1* | 4/2023 | Kolagheichi-Ganjineh ................ | |
| | | | G06V 20/588 |
| | | | 382/103 |

OTHER PUBLICATIONS

Chinese Patent Application No. 202111089405.3, Office Action dated Jun. 30, 2023; 7 pages.
Chinese Patent Application No. 202111089405.3, English translation of Office Action dated Jun. 30, 2023, 10 pages.
European Patent Application No. 22153461.3, Search and Opinion dated Jun. 30, 2022, 8 pages.

* cited by examiner

VEHICLE LOCALIZATION METHOD AND DEVICE, ELECTRONIC DEVICE AND STORAGE MEDIUM

CROSS-REFERENCE TO RELATED APPLICATIONS

This application is based upon and claims priority to Chinese Patent Application No. 202111089405.3, filed on Sep. 16, 2021, the entire content of which is incorporated herein by reference for all purposes.

TECHNICAL FIELD

The present disclosure generally relates to a field of intelligent driving technologies, and more particularly, to a vehicle localization method and device, an electronic device and a storage medium.

BACKGROUND

Automated valet parking (AVP) is a common scenario in the field of autonomous driving. The parking function should satisfy the following basic requirement. A user gives an instruction to a vehicle at a designated location, and the vehicle responds to the user's instruction and autonomously move into a parking space at a parking lot or autonomously move to a designated location from the parking space of the parking lot. Under certain circumstances, a vehicle cannot receive a global position system (GPS) signal, which requires the vehicle to perform accurate localization without the GPS signal.

Existing vehicle localization methods in the art tend to be affected by changes in light intensity, changes in the appearance of certain objects, or by the direction towards which the camera is facing, resulting in poor vehicle localization accuracy, and thus affecting the robustness of the vehicle localization method.

SUMMARY

Embodiments of the present disclosure seek to solve at least one of the problems existing in the related art to at least some extent.

In a first aspect of the present disclosure, a vehicle localization method is provided. The method includes: acquiring an image of a scene where a vehicle is located, the image including a semantic element; determining an element category corresponding to the semantic element; matching the semantic element with a map element to acquire a matching result by a matching method corresponding to the element category; and determining localization information of the vehicle according to the matching result.

In a second aspect of the present disclosure, an electronic device is provided. The electronic device includes: a memory, a processor, and a computer program stored in the memory and executable by the processor, in which the processor is configured to execute the computer program to implement operations of the vehicle localization method as described in the embodiments of the first aspect of the present disclosure.

In a third aspect of the present disclosure, provided is a non-transitory computer-readable medium having stored therein a computer program that, when executed by a processor, causes the processor to implement operations of the vehicle localization method as described in the embodiments of the first aspect of the present disclosure.

It should be understood that both the above general description and the following detailed description are explanatory and illustrative only and shall not be construed to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
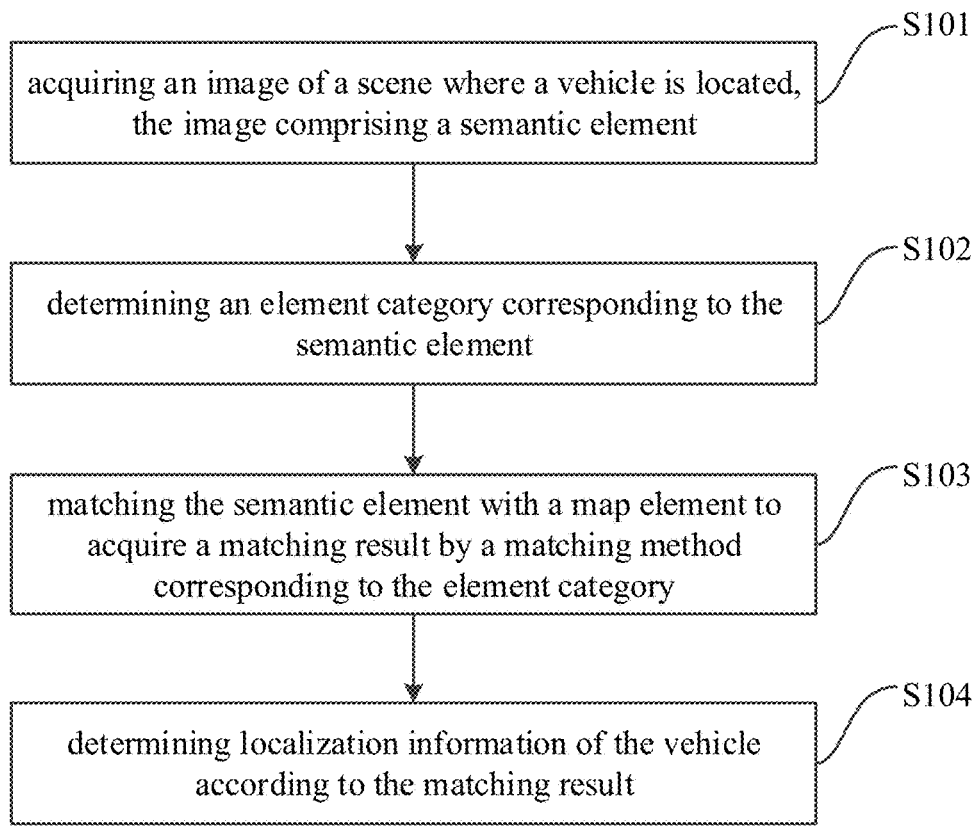
FIG. 1 is a flow chart of a vehicle localization method according to an embodiment of the present disclosure.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure. Instead, they are merely examples of methods and devices consistent with aspects related to the present disclosure as recited in the appended claims.

FIG. 1 is a flow chart of a vehicle localization method according to an embodiment of the present disclosure. An example of a vehicle localization method being deployed in a vehicle localization device is described.

In some embodiments, the vehicle localization method is configured in a vehicle localization device, and the vehicle localization device is disposed in a server, or a mobile terminal, which is not limited in the embodiments of the present disclosure.

It should be noted that an execution body of the embodiments may be, for example, a central processing unit (CPU) in the server or the mobile terminal, which is in a form of hardware, and may be, for example, a background service in the server or the mobile terminal, which is in a form of software. The specific type of the execution body is not limited herein.

As shown in FIG. 1, the vehicle localization method includes the following operations.

In block S101, an image of a scene where a vehicle is located is acquired, the image including a semantic element.

The number of the image of the scene where the vehicle is located may be one or more, and the image may be acquired by photographing the scene where the vehicle is located through a camera device such as a mobile phone, and a camera, or the image may be acquired by parsing a video stream. For example, the image may be an image of a partial video frame extracted from the video stream and containing the scene where the vehicle is located. Specific manner of acquiring the image is not limited herein.

The image of the scene where the vehicle is located includes the semantic element(s), which is used to characterize the scene where the vehicle is located. For example, when the scene where the vehicle is located is a parking lot, the semantic element may include a lane line, a parking line, a speed bump, an arrow, a zebra marking, and a dashed segment, which is not limited herein.

In some embodiments, a number of fish-eye cameras, for example, 4 fish-eye cameras disposed in the vehicle are used to acquire the image of the scene where the vehicle is located, and the number of fish-eye cameras can be adjusted according to actual situations, and is not limited herein. The fish-eye cameras can shoot for different areas of the scene where the vehicle is located to acquire images of the different areas of the scene where the vehicle is located, and the images of different areas of the scene is stitched to acquire a bird's eye view (BEV) of the scene where the vehicle is located. The BEV image is referred to as the image of the scene where the vehicle is located.

After acquiring the BEV image of the scene where the vehicle is located, a pre-trained convolutional neural network is used to perform semantic segmentation on the BEV image to acquire the semantic elements of the BEV image. The method used is not limited herein.

In block S102, an element category corresponding to the semantic element is determined.

After acquiring the semantic element of the image of the scene where the vehicle is located, the element category corresponding to the semantic element is determined, and the element category is used to describe an element type of the semantic element. The element category is not limited herein, in some embodiments, the element category includes a discrete landmark, a continuous thin landmark, and a continuous thick landmark.

In some embodiments, the determination of the element category corresponding to the semantic element includes: acquiring an element characteristic (such as a shape feature, a color feature, and/or a dimensional feature) of the semantic element of the image of the scene where the vehicle is located; and determining the element category corresponding to the semantic element according to the element characteristic of the semantic element. Any other possible method may be used to determine the element category corresponding to the semantic element, which is not limited herein.

For example, when the scene of the vehicle is a parking lot, the image of the parking lot where the vehicle is located can be acquired, and the semantic element (such as a lane line, a parking line, a speed bump, an arrow, a zebra marking, and a dashed segment) of the image of the parking lot, where the vehicle is located, is acquired. The element characteristic of the above semantic element is acquired, and the element category corresponding to the semantic element is determined according to the element characteristic. For the semantic element such as the direction arrow and the zebra marking, it is determined that the element category of the semantic element is the discrete landmark; for the semantic element such as the lane line and the parking line, it is determined that the element category of the semantic element is the continuous thin landmark; for the semantic element such as the speed bump, it is determined that the element category of the semantic element is the continuous thick landmark, which is not limited herein.

In block S103, the semantic element is matched with a map element by a matching method corresponding to the element category to acquire a matching result.

Different element categories may correspond to different matching methods. Therefore, after determining the element category corresponding to the semantic element, the matching method corresponding to the element category can be used to match the semantic element with the map element(s) to acquire a corresponding result, and this result is referred as the matching result.

Figure 2:
FIG. 2 is an image showing an application scene of a vehicle localization method according to an embodiment of the present disclosure.

A map may be acquired according to the actual scene where the vehicle is located. Correspondingly, an element used to characterize the map is referred as the map element. For example, the map is a vector map, and the map element is a vector representation of the semantic element in the vector map. FIG. 2 is an image showing an application scene of a vehicle localization method according to an embodiment of the present disclosure. As shown in FIG. 2, white lines and frames represent map elements corresponding to the semantic elements such as the lane line, the parking line, the speed bump, the arrow, the zebra marking, and the dashed segment in the vector map.

In some embodiments, matching the semantic element with the map element by the matching method corresponding to the element category includes: determining the matching method corresponding to the element category of the semantic element, and matching the semantic element with the map element by the matching method corresponding to the element category to acquire the corresponding matching result.

For example, after the element category corresponding to the semantic element (such as the direction arrow and the zebra marking) is determined to be the discrete landmark, it is determined that the matching method corresponding to the discrete landmark is a matching method A, and the matching method A is used to match the semantic element (such as the direction arrow and the zebra marking) with the map element(s) to acquire the matching result. In an embodiment, the above matching method may be, for example, a feature matching method, or a model matching method, which is not limited herein.

In some embodiments, matching the semantic element with the map element by the matching method corresponding to the element category includes: matching the semantic element with the map element by the matching method corresponding to the element category of the semantic element of the image of the scene where the vehicle is located to acquire the corresponding matching result.

Figure 3:
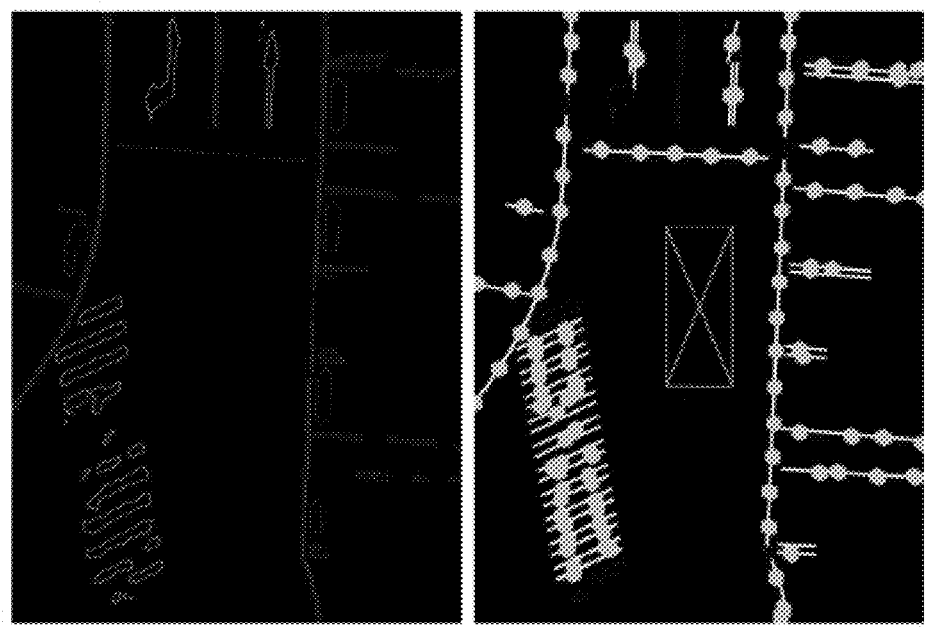
FIG. 3 is an image showing a matching effect according to an embodiment of the present disclosure.

For example, a matching algorithm corresponding to the element category is used to match the semantic element(s) with the map element(s) respectively to acquire a set of matching points matching the semantic element of the BEV image with the map element of the vector map. The set of matching points is referred as the matching result. FIG. 3 an image showing a matching effect according to an embodiment of the present disclosure.

In block S104, localization information of the vehicle is determined according to the matching result.

After matching the semantic element with the map element by the matching method corresponding to the element category to acquire the matching result, the localization information of the vehicle is determined according to the matching result. The localization information of the vehicle is information for describing the position of the vehicle. The localization information may include, for example, a pose, a coordinate position, a GPS data of the vehicle, which is not limited herein.

In some embodiments, the determination of the localization information of the vehicle according to the matching result includes: inputting the matching result as an input parameter into a pre-trained deep learning model to acquire the localization information of the vehicle output by the deep learning model. It should be understood that any other suitable manner (for example, a manner of characteristic resolution or mathematical calculation) to determine the localization information of the vehicle according to the matching result may be used, which is not limited herein.

In the embodiments of the present disclosure, after the above set of matching points matching the semantic element of the BEV image with the map element of the vector map is acquired, the multiple matching points in the set may form an observation constraint. Then a sensor fusion algorithm (for example, an error state Kalman filter (ESKF)) is used to determine the localization information of the vehicle. In some embodiments, a specific calculation is performed by the following formulas:

$$\frac{\|(x^w - c_i) * (x^w - c_i + 1)\|}{\|c_i - c_{i+1}\|};$$

$$x^w = q \otimes (T_v^i x^v) + p;$$

where $x^w$ represents a coordinate of a point corresponding to a pixel in the BEV image in a global coordinate system, $x^v$ represents a coordinate of the point corresponding to the pixel in a coordinate system that the vehicle is located in, $c_i$ represents a coordinate of an end point of a line segment of the vector map, q represents a quaternion of an inertial measurement unit (IMU) of the vehicle relative to the global coordinate, p represents a translation of the IMU of the vehicle relative to the global coordinate system, and $T_v^i$ represents a transformation from the coordinate system of the vehicle to a coordinate system of the IMU.

In the embodiments, by acquiring the image of the scene where the vehicle is located, the image including the semantic element, determining the element category corresponding to the semantic element, matching the semantic element with the map element by the matching method corresponding to the element category to acquire the matching result, and determining the localization information of the vehicle according to the matching result, the semantic element(s) can be matched with the map element(s) by the matching method corresponding to the element category of the semantic element(s). Therefore, when the matching result is used to determine the localization information of the vehicle, the accuracy of vehicle localization is improved and the robustness and applicability of the vehicle localization method are improved.

Figure 4:
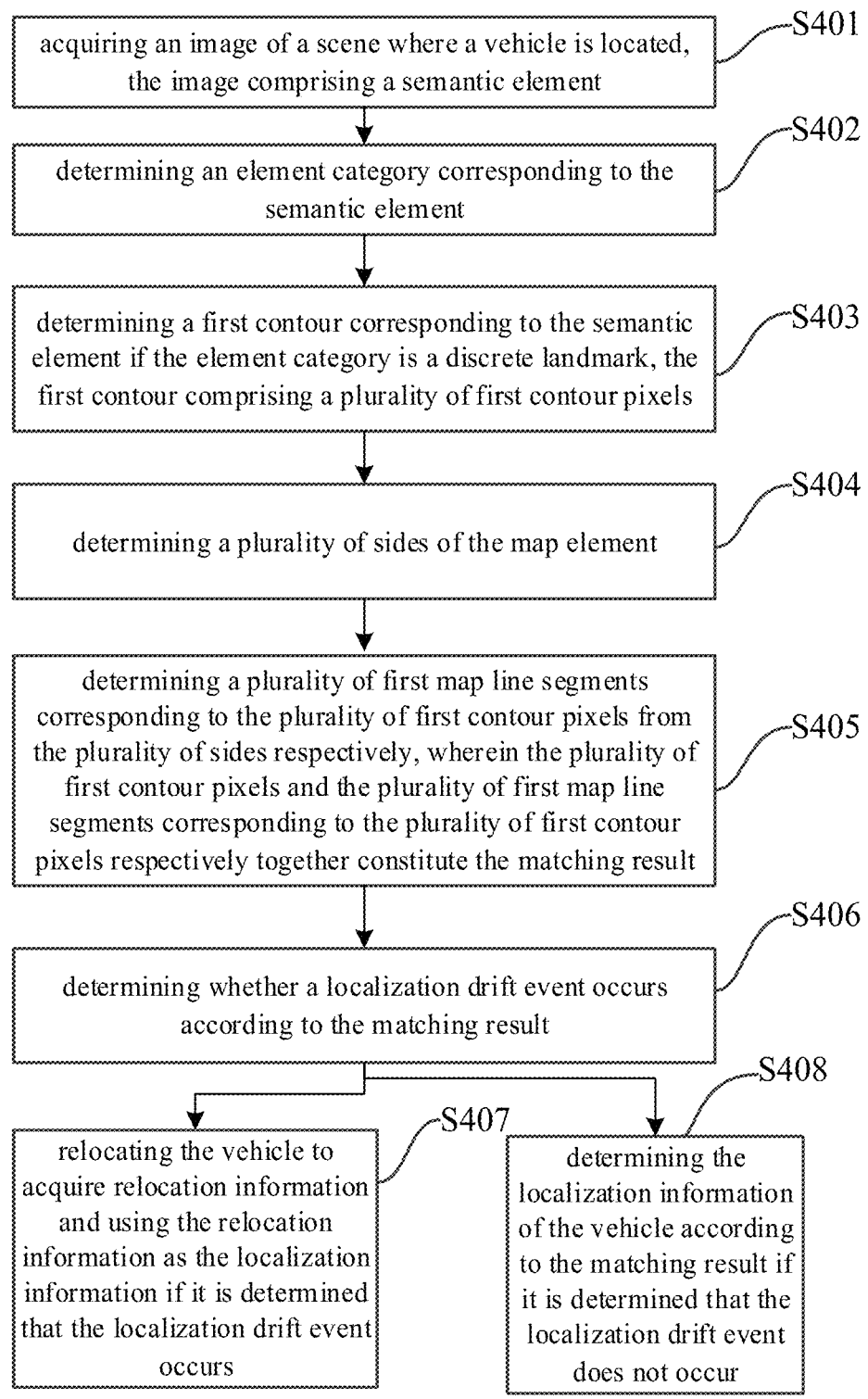
FIG. 4 is a flow chart of a vehicle localization method according to an embodiment of the present disclosure.

FIG. 4 is a flow chart of a vehicle localization method according to an embodiment of the present disclosure. As shown in FIG. 4, the vehicle localization method includes the following operations.

In block S401, an image of a scene where a vehicle is located is acquired, the image including a semantic element.

In block S402, an element category corresponding to the semantic element is determined.

Descriptions of the operations in blocks S401 and S402 may refer to the above embodiments, which are not elaborated here.

In block S403, if the element category is a discrete landmark, a first contour corresponding to the semantic element is determined, and the first contour includes a plurality of first contour pixels.

When the semantic element and the map element are matched by the matching method corresponding to the element category, if the element category is the discrete landmark, the contour of the semantic element can be determined, and the contour is referred as the first contour. The first contour includes a plurality of first contour pixels.

When the element category is the discrete landmark, the first contour may be the contour of the semantic element (e.g., the arrow, and the zebra marking).

In block S404, a plurality of sides of the map element are determined.

When the element category is the discrete landmark, the semantic element (such as the arrow and the zebra marking) is represented in a form of polygon in the vector map, and the polygon has a plurality of sides. At this time, the sides of the polygon are determined, which triggers the next operation.

In block S405, a plurality of first map line segments corresponding to the plurality of first contour pixels are determined from the plurality of sides respectively. The plurality of first contour pixels and the plurality of first map line segments corresponding to the plurality of first contour pixels respectively together constitute the matching result.

After determining the plurality of sides of the map element, the plurality of map line segments corresponding to the first contour pixels may be determined from the plurality of sides of the map element, and the map line segment is referred as the first map line segment. Each first contour pixel corresponds to a respective first map line segment, and the first contour pixels and the first map line segments together constitute the matching result.

In the embodiments of the present disclosure, the determination of the plurality of first line segments corresponding to the plurality of first contour pixels respectively from the plurality of sides may be achieved by using a matching mechanism corresponding to the discrete landmark. From the plurality of sides of the map element, the plurality of first map line segments corresponding to the plurality of first contour pixels respectively are determined, and the plurality of first contour pixels and the plurality of first map line segments are used as the matching result together.

In the embodiments of the present disclosure, a matching method corresponding to the discrete landmark is used to match the semantic element with the map element to acquire the matching result, and the matching method is suitable for the type of the discrete landmark. By using the matching method corresponding to the discrete landmark, it can effectively reduce the interference caused by other external factors to the matching process of the semantic element of the discrete landmark category, and eliminate the external interference factors, thereby significantly improving the matching effect between the semantic elements of the discrete landmark category and the map elements.

In block S406, it is determined whether a localization drift event occurs according to the matching result.

The localization drift event refers to a situation when a large deviation is between the localization information of the vehicle and an actual position information of the vehicle.

That is, during the execution of the vehicle localization method, if the localization drift event occurs, the deviation between the localization information of the vehicle and the actual position information of the vehicle is large.

Optionally, in some embodiments, the determination of the localization drift event according to the matching result includes: determining a plurality of matching degrees corresponding to the plurality of images respectively, and determining that the localization drift event has occurred when the matching degrees corresponding to a number of the images collected continuously are less than a matching threshold, where a number of the images is greater than or equal to a preset value. By determining whether the localization drift event occurs according to the matching result in combination with the matching threshold, it can avoid missing recognition of the localization drift event and effectively improve the accuracy of the determination of the localization drift event.

The matching degree is used to describe a matching situation of a respective matching result. The matching threshold is used to describe a boundary range or critical value of the matching degree, and the matching threshold may be adjusted according to actual scenarios, which is not limited herein. The images being of a number greater than or equal to the preset value are images continuously collected.

In the embodiments, a value of the matching degree may be used to quantify the matching degree. The value of the matching degree may be calculated according to the following formulas:

$$r = \frac{\sum_{k \in S} 1\{d(s, 1) > \tau_m\}}{\|S\|};$$

$$d(s, a) = \min_{l \in a} d(s, a);$$

where r represents the value of the matching degree, S represents a set of semantic pixels extracted from the BEV image, s represents a point in the set, l represents a line segment element in the vector map, d(s,l) represents a distance from a point in the set to the line segment element, and $\tau_m$ represents a preset distance threshold.

After calculating the values of the matching degrees of the multiple continuously acquired images, these values can be compared with the matching threshold. If there are the preset number or more of the continuously acquired images each have the value of the matching degree less than the matching threshold, it is determined that the localization drift event has occurred.

In block S407, if it is determined that the localization drift event occurs, the vehicle is relocated to acquire relocation information, and the relocation information is used as the localization information.

A process of relocating the vehicle is referred to as a relocation process, and correspondingly, location/localization information of the vehicle generated by relocating the vehicle is referred to as the relocation information. After the localization drift event is determined to occur according to the matching result as described above, the vehicle is relocated to acquire the relocation information, and the relocation information is used as the location/localization information.

Figure 5:
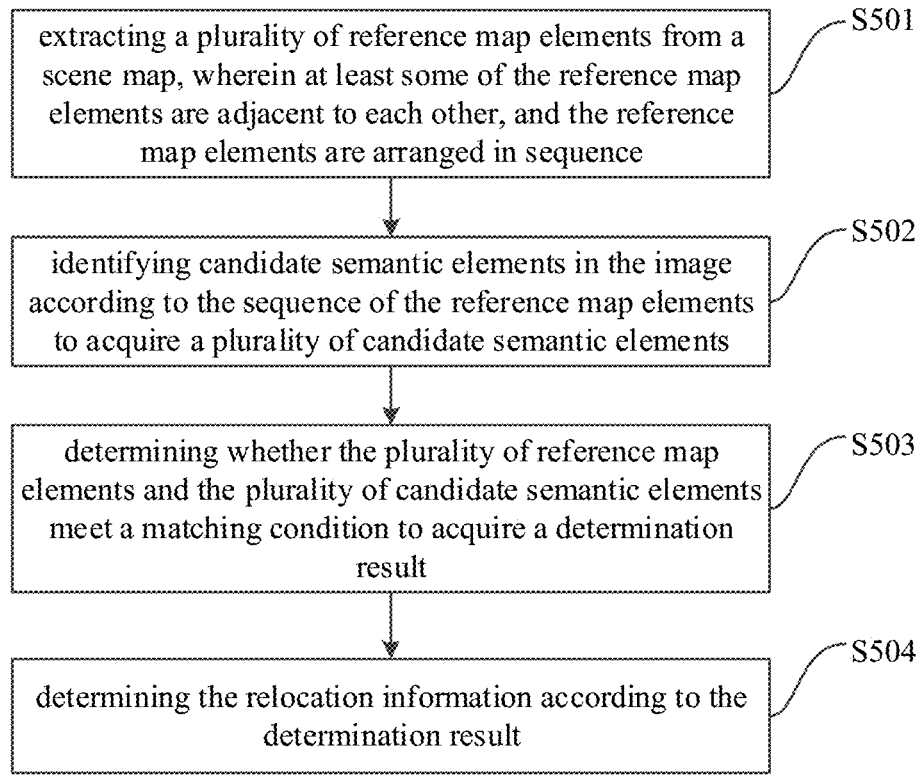
FIG. 5 is a flow chart of a vehicle localization method according to an embodiment of the present disclosure.

In some embodiments, as shown in FIG. 5, which is a flow chart of a vehicle localization method according to an embodiment of the present disclosure, relocating the vehicle to acquire the relocation information includes the following operations.

In block S501, a plurality of reference map elements are extracted from a scene map, at least some of the reference map elements are adjacent to each other, and the reference map elements are arranged in sequence.

The reference map element refers to a map element used as a reference for the relocation process of the vehicle. The reference map elements have a corresponding arrangement order, that is, they are arranged in sequence.

Figure 6:
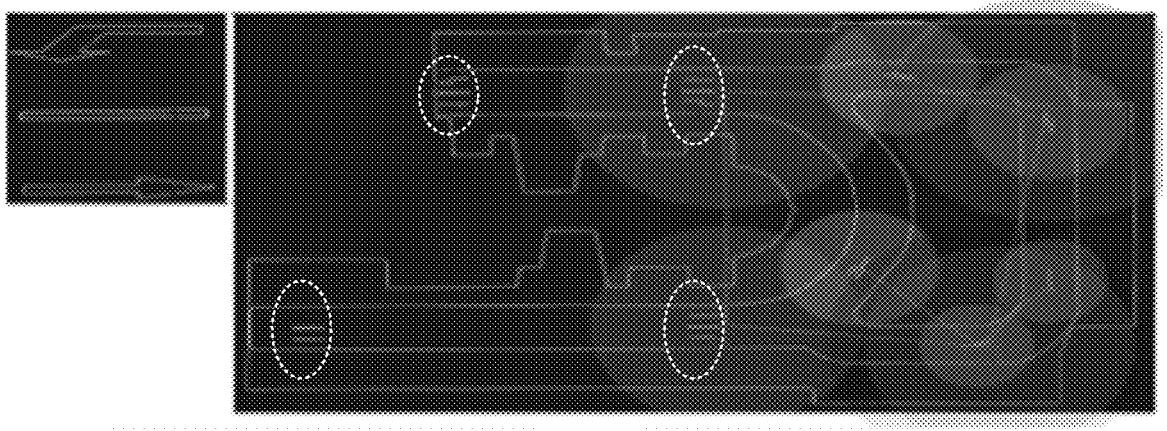
FIG. 6 is an image showing a reference map element combination according to an embodiment of the present disclosure

In the embodiments of the present disclosure, the reference map elements are extracted from the scene map. A new feature description method may be designed to distinguish different areas of the vector map. For example, landmarks are extracted from the scene map, and the landmarks are used as the reference map elements. A number of adjacent landmarks can be arranged in a certain order to form a reference map element combination, as shown in FIG. 6, which is an image showing the reference map element combination according to an embodiment of the present disclosure. The landmarks in dashed boxes in FIG. 6 may form the reference map element combination. In mathematics, every landmark in the reference map element combination is mathematically represented by $\{p_i, \theta_i, c_i\}$, i.e., a vector of three attributes, where $p_i$ represents a coordinate of a center of a landmark, $\theta_i$ represents a heading direction of the landmark, $c_i$ represents a type of the landmark, and i represents an $i^{th}$ element in the combination.

In block S502, candidate semantic elements in the image are identified according to the sequence of the reference map elements to acquire a plurality of candidate semantic elements.

After extracting the reference map elements from the scene map, the candidate semantic elements in the image can be identified according to the sequence of the reference map elements to acquire a plurality of semantic elements, which are referred as the candidate semantic elements.

In the embodiment, after extracting the landmarks from the scene map and combining the adjacent landmarks to form the reference map element combination, the candidate semantics can be identified from the BEV map according to the sequence of the reference map elements, and the candidate semantic elements can form a candidate semantic element combination.

In S503, it is determined whether the plurality of reference map elements and the plurality of candidate semantic elements meet a matching condition, to acquire a determination result.

After the candidate semantic elements in the image are identified according to the sequence and the plurality of candidate semantic elements are acquired, it is determined whether the plurality of reference map elements and the plurality of candidate semantic elements meet the matching condition, to acquire the determination result.

In the embodiment, determining whether the plurality of reference map elements and the plurality of candidate semantic elements meet the matching condition may be performed according to the following formulas:

$$\exists_\gamma \in p(\beta), \forall_i \in \{1, \ldots, n\};$$

$$\|(p_{\alpha i} - p_{\alpha 1}) - (p_{\gamma i} - p_{\gamma 1})\| < \tau_p;$$

$$\|(\theta_{\alpha i} - \theta_{\alpha 1}) - (\theta_{\gamma i} - \theta_{\gamma 1})\| < \tau_\theta;$$

$$c_{\alpha i} = c_{\gamma i};$$

where α represents the reference map element combination, β represents the candidate semantic element combination, γ represents the combination β in any arrangement sequence, $p_{\alpha i}$ represents a position of an $i^{th}$ element in the combination α, $p_{\gamma i}$ represents a position of an $i^{th}$ element in the combination γ, $\theta_{\alpha i}$ represents a heading direction of the $i^{th}$ element in the combination α, $\theta_{\gamma i}$ represents a heading direction of the $i^{th}$ element in the combination γ, $c_{\alpha i}$ represents a type of the $i^{th}$ element in the combination α, $c_{\gamma i}$ represents a type of the $i^{th}$ element in the combination γ, $^{\tau}p$ represents a position error threshold for the element, and $^{\tau}\theta$ represents an angle error threshold for the element (values of $^{\tau}p$ and $^{\tau}\theta$ can be adjusted according to actual scenarios, which are not limited herein).

If the reference map elements and the candidate semantic elements meet the matching condition, a pair of matching information $\{p_{\alpha i}, \theta_{\alpha i}, c_{\alpha i}\}$ and $\{p_{\beta i}, \theta_{\beta i}, c_{\beta i}\}$ can be acquired.

In block S504, the relocation information is determined according to the determination result.

In some embodiments, when the matching condition is satisfied between the candidate semantic elements and the reference map elements, the relocation information is determined according to a plurality of map positions each corresponding to a respective reference map element, thereby effectively improving the accuracy of the relocation information.

In the embodiments, when the candidate semantic elements and the reference map elements meet the matching condition, an initial pose of the vehicle is determined according to the matching information $\{p_{\alpha i}, \theta_{\alpha i}, c_{\alpha i}\}$ and $\{p_{\beta i}, \theta_{\beta i}, c_{\beta i}\}$ acquired above, and is acquired by calculation according to the following formulas:

$$R = \text{AngleAxis}(\theta_{\beta i} - \theta_{\alpha i}, [0,0,1]^T);$$

$$t = p_{\beta i} - p_{\alpha i};$$

where R represents a rotation angle of the vehicle relative to the global coordinate system, and t represents a translational position of the vehicle relative to the global coordinate system. The initial pose of the vehicle may be indicated by R and t.

After the initial pose of the vehicle is determined, a matching relationship between the semantic elements of the BEV image and the map elements of the vector map is established, and a pose estimation of the vehicle may be further optimized through a nonlinear optimization to determine the relocation information of the vehicle.

In other embodiments, if the candidate semantic elements and the reference map elements do not meet the matching condition, a plurality of target map elements are re-extracted from the scene map, and the reference map elements are updated with the plurality of target map elements respectively until the relocation information is determined. Because the plurality of reference map elements are updated with the plurality of target map elements respectively, the localization effect of the vehicle may be effectively guaranteed.

When the matching condition is not satisfied between the candidate semantic elements and the reference map elements as described above, map elements other than the reference map elements can be extracted from the scene map, and these map elements are referred as the target map elements. The target map elements are used to update the previously extracted reference map elements, until the target map elements and the plurality of candidate elements meet the matching condition, and the relocation information of the vehicle is determined according to the corresponding determination result.

In the embodiments, by extracting a plurality of reference map elements from a scene map, at least some of the reference map elements being adjacent to each other, and the reference map elements being arranged in sequence, identifying candidate semantic elements in the image according to the sequence of the reference map elements to acquire a plurality of candidate semantic elements, determining whether the plurality of reference map elements and the plurality of candidate semantic elements meet a matching condition, to acquire a determination result, and determining the relocation information according to the determination result, the accuracy and reliability of the relocation information may be improved, thus effectively assisting in improving the localization effect of the vehicle.

In block 408, if it is determined that the localization drift event does not occur, the localization information of the vehicle is determined according to the matching result.

It is detected that the localization drift event does not happen to the vehicle, the localization information of the vehicle is determined according to the matching result. Details of description of determining localization information of the vehicle according to the matching result may be referred to the above embodiments, which will not be elaborate here.

Therefore, in the embodiments of the present disclosure, by determining whether the localization drift event occurs, and relocating the vehicle when the localization drift event occurs, errors caused by the localization drift event to the localization information of the vehicle may be avoided, thus effectively improving the accuracy of the vehicle localization. When the localization drift event does not happen to the vehicle, the localization information of the vehicle may be immediately determined according to the matching result, which can avoid invalid operations and effectively improve the execution efficiency of the vehicle control method.

In the embodiments of the present disclosure, the image of the scene where the vehicle is located is acquired, and the image includes the semantic element. The element category corresponding to the semantic element is determined, and the matching method corresponding to the discrete landmark is used to match the semantic element with the map element to acquire the matching result. On this basis, the matching method is suitable for the discrete landmark. By using the matching method corresponding to the discrete landmark, it can effectively reduce the interference caused by other external factors to the matching process of the semantic element of the discrete landmark category, and eliminate the external interference factors, thereby significantly improving the matching effect between the semantic elements of the discrete landmark category and the map elements. Further, by determining whether the localization drift event occurs according to the matching result, and relocating the vehicle when the localization drift event occurs, errors caused by the localization drift event to the localization information of the vehicle may be avoided, thus effectively improving the accuracy of the vehicle localization. When the localization drift event does not happen to the vehicle, the localization information of the vehicle may be immediately determined according to the matching result, which can avoid invalid operations and effectively improve the execution efficiency of the vehicle control method.

Figure 7:
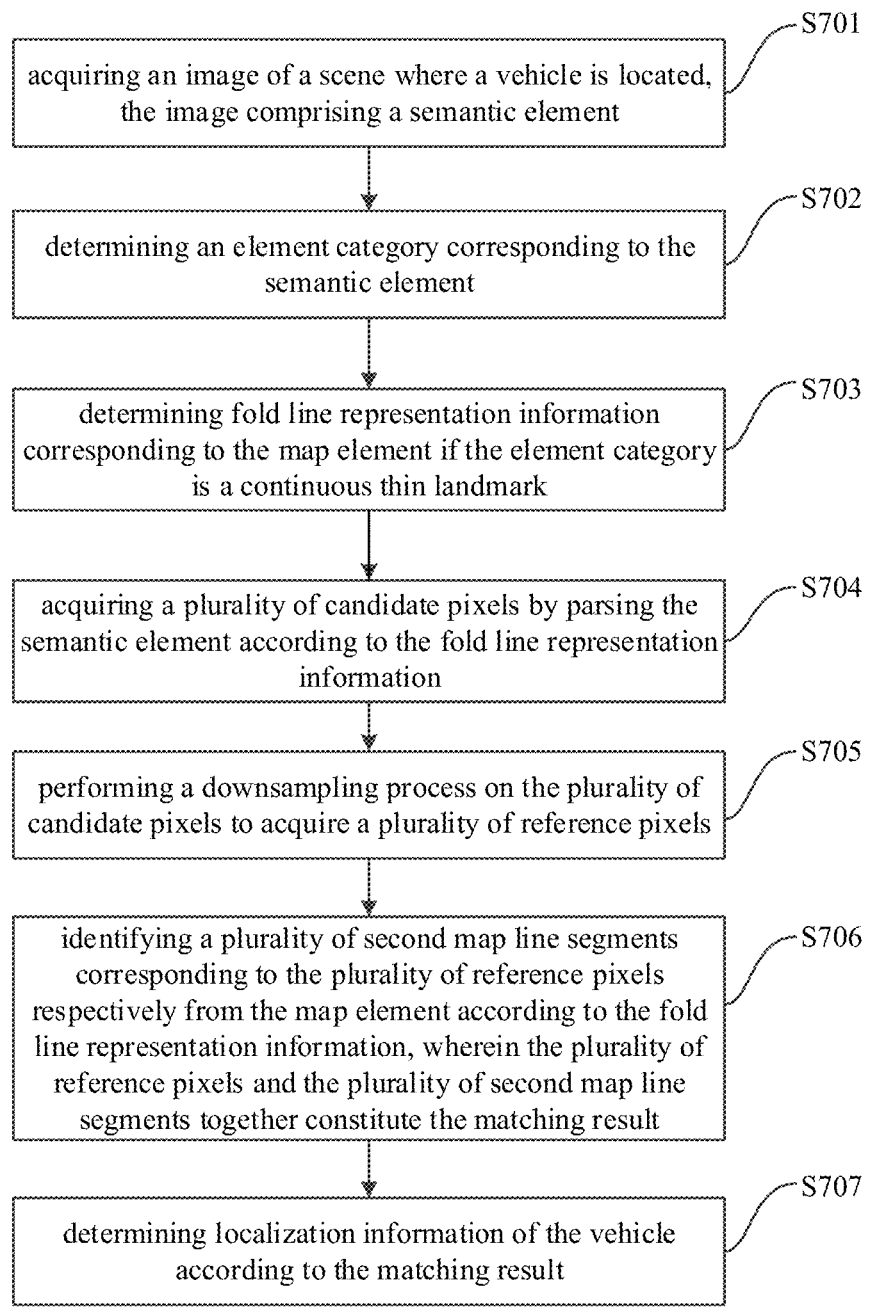
FIG. 7 is a flow chart of a vehicle localization method according to an embodiment of the present disclosure.

FIG. 7 is a flow chart of a vehicle localization method according to an embodiment of the present disclosure. As shown in FIG. 7, the vehicle localization method includes the following operations.

In block S701, an image of a scene where a vehicle is located is acquired, the image including a semantic element.

In block S702, an element category corresponding to the semantic element is determined.

Descriptions of the operations in blocks S701 and S702 may refer to the above embodiments, which are not elaborated here.

In block S703, if the element category is a continuous thin landmark, fold line representation information corresponding to the map element is determined.

When the element category is the continuous thin landmark, the semantic element (such as the lane line and the parking line) is represented in a form of the fold line in the vector map. Accordingly, information used to describe the fold line is referred as the fold line representation information. The fold line representation information includes pixel information, length information, curvature information of the fold line, which is not limited herein.

In block S704, a plurality of candidate pixels are acquired by parsing the semantic element according to the fold line representation information.

After determining the fold line representation information corresponding to the map element, a plurality of pixels can be parsed from the semantic element according to the fold line representation information, and the pixels are referred as the candidate pixels.

In block S705, a downsampling process is performed on the plurality of candidate pixels to acquire a plurality of reference pixels.

After the plurality of candidate pixels are acquired from the semantic element according to the fold line representation information, the plurality of candidate pixels can be downsampled to acquire a plurality of pixels, which are referred as the reference pixels.

In block S706, a plurality of second map line segments corresponding to the plurality of reference pixels are identified respectively from the map element according to the fold line representation information, the plurality of reference pixels and the plurality of second map line segments together constitute the matching result.

After the plurality of candidate pixels are downsampled to acquire the plurality of reference pixels, a plurality of map line segments corresponding to the plurality of reference pixels are identified from the map element according to the fold line representation information. The map line segment is referred as the second map line segment. Each reference pixel corresponds to the respective second map line segment, and the plurality of reference pixels and the plurality of second map line segments together constitute the matching result.

In the embodiments, the identification of the plurality of second map line segments corresponding to the plurality of reference pixels respectively from the map element according to the fold line representation information is achieved by using a matching mechanism corresponding to the continuous thin landmark to determine the plurality of second map line segments respectively corresponding to the plurality of reference pixels from the map element. The matching result is generated from both the plurality of reference pixels and the plurality of second map line segments respectively corresponding to the plurality of reference pixels. Since the matching method corresponding to the type of the continuous thin landmark is used, when the semantic element and the map element are matched to acquire the matching result, the matching method is suitable for the type of the continuous thin landmark. When the matching method corresponding to the type of the continuous thin landmark is used, it can effectively improve the matching effect between the semantic element of the continuous thin landmark type and the map element, and thus a divergence of estimation of the vehicle localization information can be avoided according to the matching effect, significantly improving the accuracy of the vehicle localization.

In S707, the localization information of the vehicle is determined according to the matching result.

Description of the operation in block S707 may refer to the above embodiments, which is not elaborated here.

In the embodiments, the image of the scene where the vehicle is located is acquired, and the image includes the semantic element. The element category corresponding to the semantic element is determined, and the matching method corresponding to the continuous thin landmark is used to match the semantic element with the map element to acquire the matching result. On this basis, the matching method may be suitable for the continuous thin landmark. When the matching method corresponding to the type of thin landmark is used, it can effectively improve the matching effect between the semantic element of the continuous thin landmark type and the map element, and thus the divergence of estimation of the vehicle localization information can be avoided according to the matching effect, significantly improving the accuracy of the vehicle localization.

Figure 8:
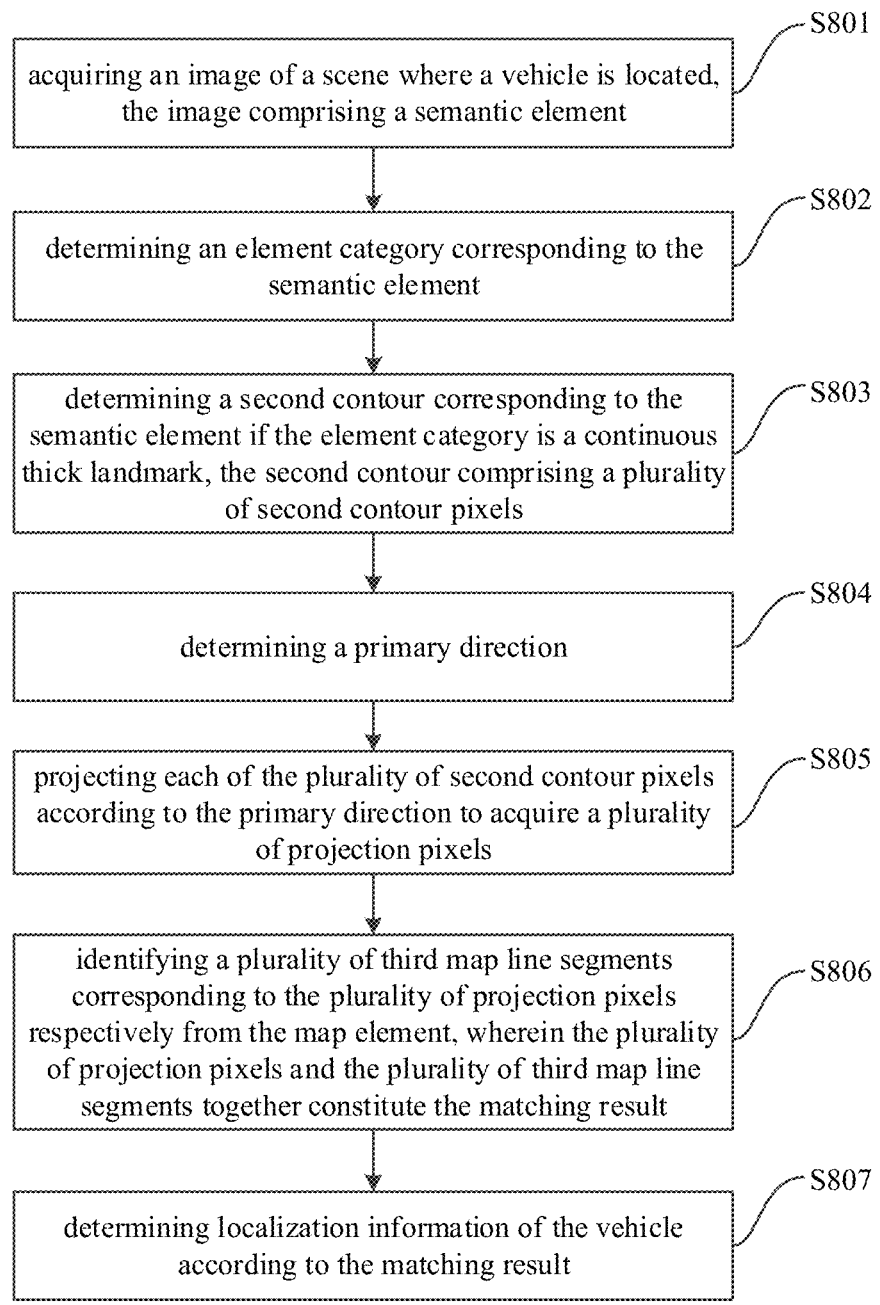
FIG. 8 is a flow chart of a vehicle localization method according to an embodiment of the present disclosure.

FIG. 8 is a flow chart of a vehicle localization method according to an embodiment of the present disclosure. As shown in FIG. 8, the vehicle localization method includes the following operations.

In block S801, an image of a scene where a vehicle is located is acquired, the image including a semantic element.

In block S802, an element category corresponding to the semantic element is determined.

Descriptions of the operations in blocks S801 and S802 may refer to the above embodiments, which are not elaborated here.

In block S803, if the element category is a continuous thick landmark, a second contour corresponding to the semantic element is determined, and the second contour includes a plurality of second contour pixels.

When the semantic element and the map element are matched by the matching method corresponding to the element category, if the element category is the continuous thick landmark, the contour of the semantic element can be determined, and the contour is referred as the second contour. The second contour includes the plurality of second contour pixels.

When the element category is the continuous thick landmark, the semantic element (e.g., the speed bump) is represented by a fold line or line segment in the vector map, and the second contour may be the contour of the speed bump.

In block S804, a primary direction is determined.

In the application scenario of the vehicle localization method, a dimensionality reduction process may be performed on the plurality of second contour pixels to acquire a projection direction of the second contour pixels, and the projection processing may be performed on the second contour pixels according to the projection direction. The projection direction is referred as the primary direction.

Optionally, in some embodiments, the determination of the primary direction includes: determining a plurality of pixel coordinates corresponding to the plurality of second contour pixels respectively, and processing the plurality of pixel coordinates by primary component analysis to acquire the primary direction. Therefore, the reliability of the determined primary direction may be effectively guaranteed, and subsequent operations of the vehicle localization method can be performed smoothly according to the primary direction. Alternatively, the primary direction may be determined in any other suitable manner, such as a manner of post-feature elimination or high correlation, which is not limited herein.

In block S805, each of the plurality of second contour pixels is projected according to the primary direction to acquire a plurality of projection pixels.

After determining the primary direction, the plurality of second contour pixels can be projected in the primary direction to acquire a plurality of pixels, which are referred as the projection pixels. That is, after determining the primary direction, the contour pixels corresponding to the semantic element are projected to the primary direction to acquire the plurality of projection pixels.

In block S806, a plurality of third map line segments corresponding to the plurality of projection pixels respectively are identified from the map element, the plurality of projection pixels and the plurality of third map line segments together constitute the matching result.

After projecting the plurality of second contour pixels according to the primary direction to acquire the plurality of projection pixels, the plurality of map segments corresponding to the plurality of projection pixels respectively can be identified from the map element of the vector map, and the map line segment is referred as the third map line segment.

In the embodiments, the identification of the plurality of third map line segments corresponding to the plurality of projection pixels respectively from the map element is achieved by using a matching mechanism corresponding to the continuous thick landmark to determine the plurality of third map line segments corresponding to the plurality of projection pixels respectively from the map element. The matching result is generated from both the plurality of projection pixels and the plurality of third map line segments respectively corresponding to the plurality of projection pixels. Since the matching method corresponding to the type of the continuous thick landmark is used, when the semantic element and the map element are matched to acquire the matching result, the matching method is suitable for the type of the continuous thin landmark. When the matching method corresponding to the type of the continuous thick landmark is used, the matching effect between the semantic element of the continuous thick landmark type and the map element can be guaranteed to the maximum extent, and thus the localization effect for the vehicle is effectively improved according to the matching result.

In S807, the localization information of the vehicle is determined according to the matching result.

Description of the operation in block S807 may refer to the above embodiments, which is not elaborated here.

In this embodiment, the image of the scene where the vehicle is located is acquired, and the image includes the semantic element. The element category corresponding to the semantic element is determined, and the matching method corresponding to the continuous thick landmark is used to match the semantic element with the map element to acquire the matching result. On this basis, the matching method may be suitable for the continuous thick landmark. When the matching method corresponding to the type of the continuous thick landmark is used, the matching effect between the semantic element of the continuous thick landmark type and the map element can be guaranteed to the maximum extent, and thus the localization effect for the vehicle is effectively improved according to the matching result.

Figure 9:
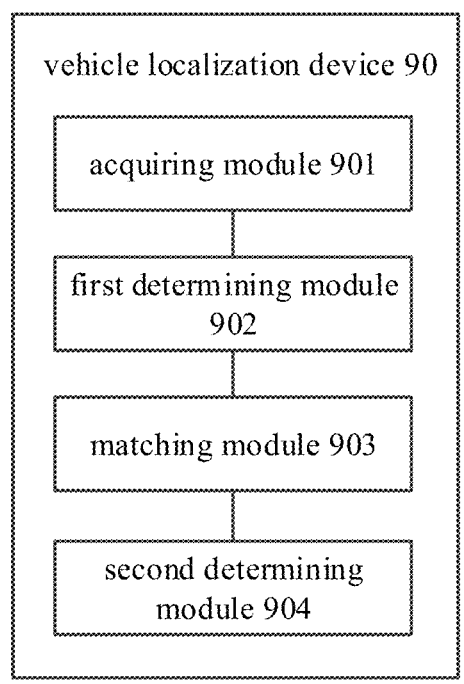
FIG. 9 is a block diagram of a vehicle localization device according to an embodiment of the present disclosure.

FIG. 9 is a block diagram of a vehicle localization device according to an embodiment of the present disclosure. As shown in FIG. 9, the vehicle localization device includes: an acquiring module 901, configured to acquire an image of a scene where a vehicle is located is acquired, the image including a semantic element; a first determining module 902, configured to determine an element category corresponding to the semantic element; a matching module 903, configured to match the semantic element with a map element by a matching method corresponding to the element category to acquire a matching result; and a second determining module 904, configured to determine localization information of the vehicle according to the matching result.

Figure 10:
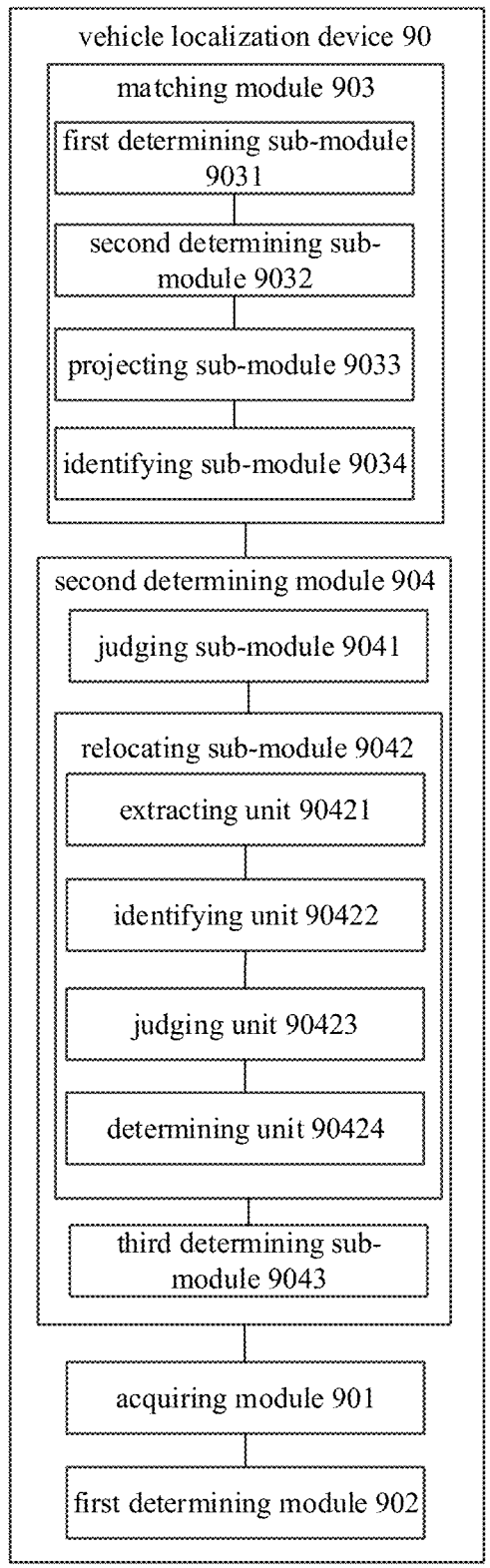
FIG. 10 is a block diagram of a vehicle localization device according to an embodiment of the present disclosure.

In some embodiments of the present disclosure, the element category includes at least one selected from a discrete landmark, a continuous thin landmark and a continuous thick landmark. FIG. 10 is a block diagram of a vehicle localization device according to an embodiment of the present disclosure. As shown in FIG. 10, the matching module 903 and the second determining module 904 may include specific modules and/or units, which is described as follows.

In some embodiments of the present disclosure, the matching module 903 is specifically configured to: determine a first contour corresponding to the semantic element if the element category is a discrete landmark, the first contour including a plurality of first contour pixels; determine a plurality of sides of the map element; and determine a plurality of first map line segments corresponding to the plurality of first contour pixels from the plurality of sides respectively, the plurality of first contour pixels and the plurality of first map line segments corresponding to the plurality of first contour pixels respectively together constituting the matching result.

In some embodiments of the present disclosure, the matching module 903 is specifically configured to: determine fold line representation information corresponding to the map element if the element category is a continuous thin landmark; acquire a plurality of candidate pixels by parsing the semantic element according to the fold line representation information; perform a downsampling process on the plurality of candidate pixels to acquire a plurality of reference pixels; and identify a plurality of second map line segments corresponding to the plurality of reference pixels respectively from the map element according to the fold line representation information, in which the plurality of reference pixels and the plurality of second map line segments together constitute the matching result.

In some embodiments of the present disclosure, the matching module 903 includes: a first determining sub-module 9031, configured to determine a second contour corresponding to the semantic element if the element category is a continuous thick landmark, in which the second contour includes a plurality of second contour pixels; a second determining sub-module 9032, configured to determine a primary direction; a projecting sub-module 9033, configured to project each of the plurality of second contour pixels according to the primary direction to acquire a plurality of projection pixels; and an identifying sub-module 9034 configured to identify a plurality of third map line segments corresponding to the plurality of projection pixels respectively from the map element, in which the plurality of projection pixels and the plurality of third map line segments together constitute the matching result.

In some embodiments of the present disclosure, the second determining sub-module 9032 is specifically configured to: determine a plurality of pixel coordinates corresponding to the plurality of second contour pixels respectively, and process the plurality of pixel coordinates by primary component analysis to acquire the primary direction.

In some embodiments of the present disclosure, the second determining module 904 includes: a judging sub-module 9041, configured to determine whether a localization drift event occurs according to the matching result; a relocating sub-module 9042, configured to relocate the vehicle to acquire relocation information if it is determined that the localization drift event occurs, in which the relocation information is used as the localization information; and a third determining sub-module 9043, configured to determine the localization information of the vehicle according to the matching result if it is determined that the localization drift event does not occur.

In some embodiments of the present disclosure, a plurality of images exist and each image has a respective matching result. The judging sub-module 9041 is specifically configured to: determine a plurality of matching degrees corresponding to the plurality of images respectively, and determine that the localization drift event has occurred when the plurality of matching degrees corresponding to a number of the images collected continuously are less than a matching threshold, where a number of the images is greater than or equal to a preset value. The matching degree is used to describe a matching situation of a respective matching result.

In some embodiments of the present disclosure, the map element is extracted from a scene map, and the relocating sub-module 9042 includes: an extracting unit 90421, configured to extract a plurality of reference map elements from the scene map, in which at least some of the reference map elements are adjacent to each other, and the reference map elements are arranged in sequence; an identifying unit 90422, configured to identify candidate semantic elements in the image according to the sequence of the reference map elements to acquire a plurality of candidate semantic elements; a judging unit 90423, configured to determine whether the plurality of reference map elements and the plurality of candidate semantic elements meet a matching condition, to acquire a determination result; and a determining unit 90424, configured to determine the relocation information according to the determination result.

In some embodiments of the present disclosure, the determining unit 90424 is specifically configured to: determine the relocation information according to a plurality of map positions corresponding to the plurality of reference map elements respectively if the plurality of reference map elements and the plurality of candidate semantic elements meet the matching condition; re-extract a plurality of target map elements from the scene map, and update the plurality of reference map elements with the plurality of target map elements respectively until the relocation information is determined if the plurality of reference map elements and the plurality of candidate semantic elements do not meet the matching condition.

It should be noted that the description of the embodiments of the vehicle localization method is also applicable to the embodiments of the vehicle localization device, which is not elaborated here.

In the embodiments, by acquiring the image of the scene where the vehicle is located, the image including the semantic element, determining the element category corresponding to the semantic element, matching the semantic element with the map element by the matching method corresponding to the element category to acquire the matching result, and determining the localization information of the vehicle according to the matching result, the semantic element(s) can be matched with the map element(s) by the matching method corresponding to the element category of the semantic element(s). Therefore, when the matching result is used to determine the localization information of the vehicle, the accuracy of vehicle localization is improved and the robustness and applicability of the vehicle localization method are improved.

Figure 11:
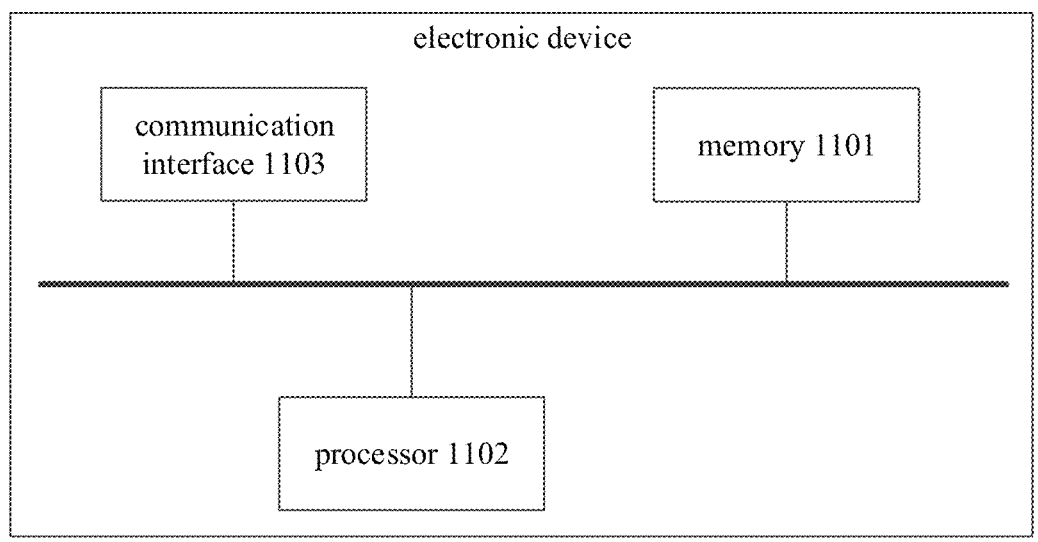
FIG. 11 is a block diagram of an electronic device according to an embodiment of the present disclosure.

FIG. 11 is a block diagram of an electronic device according to an embodiment of the present disclosure. The electronic device may include a memory 1101, a processor 1102, a computer program stored in the memory 1101 and executable by the processor 1102. When the program is executed by the processor, the processor performs the vehicle localization method of the above embodiment.

In some embodiments, the electronic device further includes: a communication interface 1103 for communication between the memory 1101 and the processor 1102.

The memory 1101 stores the computer program that can be executed by the processor 1102. The memory 1101 may include a random access memory and a non-volatile memory, for example, a disk storage.

The processor 1102 is configured to execute the program to perform the vehicle localization method of the above embodiment.

If the memory 1101, the processor 1102, and the communication interface 1103 are implemented independently, the communication interface 1103, the memory 1101, and the processor 1102 may be connected to each other through a bus to realize the mutual communication. The bus may be an industry standard architecture (ISA) bus, a peripheral component (PCI) bus, or an extended industry standard architecture (EISA) bus. The bus may be an address bus, a data bus, or a control bus. For brief presentation, the bus is represented by a solid line in FIG. 11, but it does not mean that there is only one bus or one type of bus.

Alternatively, the memory 1101, the processor 1102, and the communication interface 1103 are integrated on a single chip, and the memory 1101, the processor 1102, and the communication interface 1103 can communicate with each other through internal interfaces.

The processor 1102 may be a central processing unit (CPU), or an application specific integrated circuit (ASIC), or may be configured as one or more integrated circuits of the embodiments of the present disclosure.

In some embodiments, a computer-readable storage medium is provided. The medium stores a computer program that, when executed by a processor, causes the processor to perform the vehicle localization method as described in the above embodiments.

In some embodiments, a computer program product including instructions is provided. When the instructions are executed by a processor, the vehicle localization method as described in the above embodiments is executed.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

It will be understood that, the flow chart or any process or method described herein in other manners may represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted. For example, the order of execution of two or more boxes may be scrambled relative to the order shown.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It can be understood that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be, but is not limited to, read-only memories, magnetic disks, or optical disks.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A vehicle localization method, comprising:
    acquiring an image of a scene where a vehicle is located, the image comprising a semantic element;
    determining an element category corresponding to the semantic element, wherein the element category comprises at least one member selected from the group consisting of a discrete landmark, a continuous thin landmark and a continuous thick landmark;
    matching the semantic element with a map element to acquire a matching result by a matching method corresponding to the element category; and
    determining localization information of the vehicle according to the matching result;
    wherein if the element category is a continuous thin landmark, acquiring the matching result comprises:
    determining fold line representation information corresponding to the map element;
    acquiring a plurality of candidate pixels by parsing the semantic element according to the fold line representation information;
    performing a downsampling process on the plurality of candidate pixels to acquire a plurality of reference pixels; and
    identifying a plurality of second map line segments corresponding to the plurality of reference pixels respectively from the map element according to the fold line representation information, wherein the plurality of reference pixels and the plurality of second map line segments together constitute the matching result;
    wherein if the element category is a continuous thick landmark, acquiring the matching result comprises:
    determining a second contour corresponding to the semantic element, the second contour comprising a plurality of second contour pixels;

determining a primary direction;
projecting each of the plurality of second contour pixels according to the primary direction to acquire a plurality of projection pixels; and
identifying a plurality of third map line segments corresponding to the plurality of projection pixels respectively from the map element, wherein the plurality of projection pixels and the plurality of third map line segments together constitute the matching result.

2. The vehicle localization method according to claim 1, wherein the continuous thin landmark is selected from a lane line and a parking line, and the continuous thick landmark is a speed bump.

3. The vehicle localization method according to claim 1, wherein matching the semantic element with a map element by the matching method corresponding to the element category to acquire a matching result comprises:
determining a first contour corresponding to the semantic element if the element category is a discrete landmark, the first contour comprising a plurality of first contour pixels;
determining a plurality of sides of the map element; and
determining a plurality of first map line segments corresponding to the plurality of first contour pixels from the plurality of sides respectively, wherein the plurality of first contour pixels and the plurality of first map line segments corresponding to the plurality of first contour pixels respectively together constitute the matching result.

4. The vehicle localization method according to claim 1, wherein determining the primary direction comprises:
determining a plurality of pixel coordinates corresponding to the plurality of second contour pixels respectively; and
processing the plurality of pixel coordinates by primary component analysis to acquire the primary direction.

5. The vehicle localization method according to claim 1, wherein determining localization information of the vehicle according to the matching result comprises:
determining whether a localization drift event occurs according to the matching result;
relocating the vehicle to acquire relocation information and using the relocation information as the localization information if it is determined that the localization drift event occurs; and
determining the localization information of the vehicle according to the matching result if it is determined that the localization drift event does not occur.

6. The vehicle localization method according to claim 5, wherein a plurality of images is acquired and each image has a respective matching result, and
wherein determining whether the localization drift event occurs according to the matching result comprises:
determining a plurality of matching degrees Corresponding to the plurality of images respectively, wherein the matching degree refers to a matching situation of a respective matching result; and
determining that the localization drift event has occurred when the plurality of matching degrees Corresponding to a number of the images collected continuously are less than a matching threshold, wherein a number of the images is greater than or equal to a preset value.

7. The vehicle localization method according to claim 5, wherein the map element is extracted from a scene map, and relocating the vehicle to acquire the relocation information comprises:

extracting a plurality of reference map elements from the scene map, wherein at least some of the reference map elements are adjacent to each other, and the reference map elements are arranged in sequence;
identifying candidate semantic elements in the image according to the sequence of the reference map elements to acquire a plurality of candidate semantic elements;
determining whether the plurality of reference map elements and the plurality of candidate semantic elements meet a matching condition to acquire a determination result; and
determining the relocation information according to the determination result.

8. The vehicle localization method according to claim 7, wherein determining the relocation information according to the determination result comprises:
determining the relocation information according to a plurality of map positions corresponding to the plurality of reference map elements respectively if the plurality of reference map elements and the plurality of candidate semantic elements meet the matching condition; and
re-extracting a plurality of target map elements from the scene map, and updating the plurality of reference map elements with the plurality of target map elements respectively until the relocation information is determined if the plurality of reference map elements and the plurality of candidate semantic elements do not meet the matching condition.

9. An electronic device, comprising:
a memory,
a processor, and
a computer program stored in the memory and executable by the processor, wherein the processor is configured to execute the computer program to implement a vehicle localization method comprising:
acquiring an image of a scene where a vehicle is located, the image comprising a semantic element;
determining an element category corresponding to the semantic element, wherein the element category comprises at least one member selected from the group consisting of a discrete landmark, a continuous thin landmark and a continuous thick landmark;
matching the semantic element with a map element to acquire a matching result by a matching method corresponding to the element category; and
determining localization information of the vehicle according to the matching result;
wherein if the element category is a continuous thin landmark, acquiring the matching result comprises:
determining fold line representation information corresponding to the map element;
acquiring a plurality of candidate pixels by parsing the semantic element according to the fold line representation information;
performing a downsampling process on the plurality of candidate pixels to acquire a plurality of reference pixels; and
identifying a plurality of second map line segments corresponding to the plurality of reference pixels respectively from the map element according to the fold line representation information, wherein the plurality of reference pixels and the plurality of second map line segments together constitute the matching result;

wherein if the element category is a continuous thick landmark, acquiring the matching result comprises:
determining a second contour corresponding to the semantic element, the second contour comprising a plurality of second contour pixels;
determining a primary direction;
projecting each of the plurality of second contour pixels according to the primary direction to acquire a plurality of projection pixels; and
identifying a plurality of third map line segments corresponding to the plurality of projection pixels respectively from the map element, wherein the plurality of projection pixels and the plurality of third map line segments together constitute the matching result.

10. The electronic device according to claim 9, wherein the continuous thin landmark is selected from a lane line and a parking line, and the continuous thick landmark is a speed bump.

11. The electronic device according to claim 9, wherein matching the semantic element with a map element by the matching method corresponding to the element category to acquire a matching result comprises:
determining a first contour corresponding to the semantic element if the element category is a discrete landmark, the first contour comprising a plurality of first contour pixels;
determining a plurality of sides of the map element; and
determining a plurality of first map line segments corresponding to the plurality of first contour pixels from the plurality of sides respectively, wherein the plurality of first contour pixels and the plurality of first map line segments corresponding to the plurality of first contour pixels respectively together constitute the matching result.

12. The electronic device according to claim 9, wherein determining localization information of the vehicle according to the matching result comprises:
determining whether a localization drift event occurs according to the matching result;
relocating the vehicle to acquire relocation information and using the relocation information as the localization information if it is determined that the localization drift event occurs; and
determining the localization information of the vehicle according to the matching result if it is determined that the localization drift event does not occur.

13. The electronic device according to claim 12, wherein a plurality of images are acquired and each image has a respective matching result, and
wherein determining whether the localization drift event occurs according to the matching result comprises:
determining a plurality of matching degrees Corresponding to the plurality of images respectively, wherein the matching degree refers to a matching situation of a respective matching result; and
determining that the localization drift event has occurred when the plurality of matching degrees Corresponding to a number of the images collected continuously are less than a matching threshold, wherein a number of the images is greater than or equal to a preset value.

14. The electronic device according to claim 12, wherein the map element is extracted from a scene map, and relocating the vehicle to acquire the relocation information comprises:
extracting a plurality of reference map elements from the scene map, wherein at least some of the reference map elements are adjacent to each other, and the reference map elements are arranged in sequence;
identifying candidate semantic elements in the image according to the sequence of the reference map elements to acquire a plurality of candidate semantic elements;
determining whether the plurality of reference map elements and the plurality of candidate semantic elements meet a matching condition to acquire a determination result; and
determining the relocation information according to the determination result.

15. The electronic device according to claim 14, wherein determining the relocation information according to the determination result comprises:
determining the relocation information according to a plurality of map positions corresponding to the plurality of reference map elements respectively if the plurality of reference map elements and the plurality of candidate semantic elements meet the matching condition; and
re-extracting a plurality of target map elements from the scene map, and updating the plurality of reference map elements with the plurality of target map elements respectively until the relocation information is determined if the plurality of reference map elements and the plurality of candidate semantic elements do not meet the matching condition.

16. A non-transitory computer-readable storage medium having stored therein a computer program that, when executed by a processor, causes the processor to implement a vehicle localization method comprising:
acquiring an image of a scene where a vehicle is located, the image comprising a semantic element;
determining an element category corresponding to the semantic element, wherein the element category comprises at least one member selected from the group consisting of a discrete landmark, a continuous thin landmark and a continuous thick landmark;
matching the semantic element with a map element to acquire a matching result by a matching method corresponding to the element category; and
determining localization information of the vehicle according to the matching result;
wherein if the element category is a continuous thin landmark, acquiring the matching result comprises:
determining fold line representation information corresponding to the map element;
acquiring a plurality of candidate pixels by parsing the semantic element according to the fold line representation information;
performing a downsampling process on the plurality of candidate pixels to acquire a plurality of reference pixels; and
identifying a plurality of second map line segments corresponding to the plurality of reference pixels respectively from the map element according to the fold line representation information, wherein the plurality of reference pixels and the plurality of second map line segments together constitute the matching result;
wherein if the element category is a continuous thick landmark, acquiring the matching result comprises:
determining a second contour corresponding to the semantic element, the second contour comprising a plurality of second contour pixels;

determining a primary direction;

projecting each of the plurality of second contour pixels according to the primary direction to acquire a plurality of projection pixels; and identifying a plurality of third map line segments corresponding to the plurality of projection pixels respectively from the map element, wherein the plurality of projection pixels and the plurality of third map line segments together constitute the matching result.

17. The electronic device according to claim 9, wherein determining the primary direction comprises:

determining a plurality of pixel coordinates corresponding to the plurality of second contour pixels respectively; and processing the plurality of pixel coordinates by primary component analysis to acquire the primary direction.

18. The non-transitory computer-readable storage medium according to claim 16, wherein the continuous thin landmark is selected from a lane line and a parking line, and the continuous thick landmark is a speed bump.

19. The non-transitory computer-readable storage medium according to claim 16, wherein matching the semantic element with a map element by the matching method corresponding to the element category to acquire a matching result comprises:

determining a first contour corresponding to the semantic element if the element category is a discrete landmark, the first contour comprising a plurality of first contour pixels;

determining a plurality of sides of the map element; and determining a plurality of first map line segments corresponding to the plurality of first contour pixels from the plurality of sides respectively, wherein the plurality of first contour pixels and the plurality of first map line segments corresponding to the plurality of first contour pixels respectively together constitute the matching result.

20. The non-transitory computer-readable storage medium according to claim 16, wherein determining the primary direction comprises:

determining a plurality of pixel coordinates corresponding to the plurality of second contour pixels respectively; and processing the plurality of pixel coordinates by primary component analysis to acquire the primary direction.

\* \* \* \* \*